Oct. 9, 1956 D. J. D. PUGSLEY 2,766,379

TELEVISION WAVEFORM GENERATOR

Filed March 17, 1952 4 Sheets-Sheet 1

INVENTOR
Donald John Davey Pugsley
BY
[signature]
ATTORNEYS

Oct. 9, 1956 D. J. D. PUGSLEY 2,766,379

TELEVISION WAVEFORM GENERATOR

Filed March 17, 1952 4 Sheets-Sheet 2

INVENTOR
Donald John Davey Pugsley
BY O'Boyle + Blair
ATTORNEYS.

Oct. 9, 1956 D. J. D. PUGSLEY 2,766,379

TELEVISION WAVEFORM GENERATOR

Filed March 17, 1952 4 Sheets-Sheet 3

INVENTOR
Donald John Davey Pugsley
BY Bayle & Blair
ATTORNEYS

Oct. 9, 1956 D. J. D. PUGSLEY 2,766,379

TELEVISION WAVEFORM GENERATOR

Filed March 17, 1952

4 Sheets-Sheet 4

INVENTOR
Donald John Davey Pugsley
BY
O'Boyle + Blair
ATTORNEYS

United States Patent Office 2,766,379

Patented Oct. 9, 1956

2,766,379

TELEVISION WAVEFORM GENERATOR

Donald John D. Pugsley, Cambridge, England, assignor to Pye Limited, Cambridge, England, a British company Application March 17, 1952, Serial No. 276,918

Claims priority, application Great Britain February 13, 1952

14 Claims. (Cl. 250—36)

The present invention relates to a generator of waveforms comprising line and frame synchronising pulses, more particularly for television transmitting apparatus. In such apparatus the output from a master oscillator is used to produce the line synchronising signals and also to feed a divider network which divides by the number of lines per picture. The output pulses from the divider are used to trigger the generators for the frame synchronising pulses, the frame blanking pulses, and any other frame pulses.

One apparatus for this purpose is described in the specification of co-pending application Serial No. 113,126 of Ernest Oliver Holland and James Boyd Smith, filed 30th August 1949, now Patent No. 2,705,285, in which the divider comprises a plurality of series-connected binary counters, the necessary feedback circuits being completed to achieve the required division. The output from the divider is fed to trigger the frame pulse generator and the frame blanking generator each comprising a separate circuit to count twice-line-frequency pulses by the number required to give an output pulse of the correct width.

The present invention has for an object to avoid the necessity of providing separate counters for gating the frame synchronising and frame blanking pulses and to produce all the frame pulses by appropriate design of the divider and with the addition of only simple trigger circuits, thereby reducing the number of values required in the waveform generator.

To this end, according to one feature of the invention, an apparatus for generating a waveform comprising line and frame synchronising pulses, particularly for television transmission systems, comprises a divider fed from the master oscillator, the output from said divider producing output pulses at the frame repetition frequency, wherein said divider is designed so that pulses will also be produced at various points therealong which occur at intervals after an output pulse corresponding to the time interval of the frame pulses it is required to produce, the output pulse from the divider being fed to trigger one or more switch circuits in one direction, and the pulses produced at the selected point or points along the divider being used to trigger the switch circuit, or respectively one of the switch circuits, in the opposite direction, whereby the or each switch circuit will produce an output pulse having a duration corresponding to the required frame synchronising pulses and/or frame blanking pulses.

For producing the complete synchronising waveform, it is the practice to produce trains of triggering pulses with different time delays for each train corresponding to the timing of the leading and trailing edges of the various line and frame pulses of the complete synchronising waveform to be produced, all those pulses which are not required for producing the complete waveform being gated out by gating circuits controlled by the frame synchronising pedestal and, in the American system, also by the equalising pedestal. Thus the twice-line frequency pulses corresponding to the line leading edges have alternate pulses gated out except during the frame synchronising period; the trailing edges of the line synchronising pulses are gated out during the frame synchronising periods; and the trailing edges of the frame synchronising pulses are gated out except during the frame synchronising periods. Additionally, in the American system, the pulses corresponding to the trailing edges of the equalising pulses are gated out except during the equalising pulse periods.

According to a further feature of the invention, a circuit is provided in which the pulses corresponding to the trailing edges of the frame synchronising pulses are applied continuously to the complete synchronising generator, the circuit being such that these pulses only become effective to produce a switching operation during the frame synchronising periods. This results in a saving of equipment as it eliminates the gating circuit (and also the associated circuiting for generating the gating waveform) previously used for gating out some of the pulses corresponding to the trailing edges of the frame synchronising pulses.

In order that the invention may be more clearly understood, reference will now be made to the accompanying drawings in which.

Figure 1:
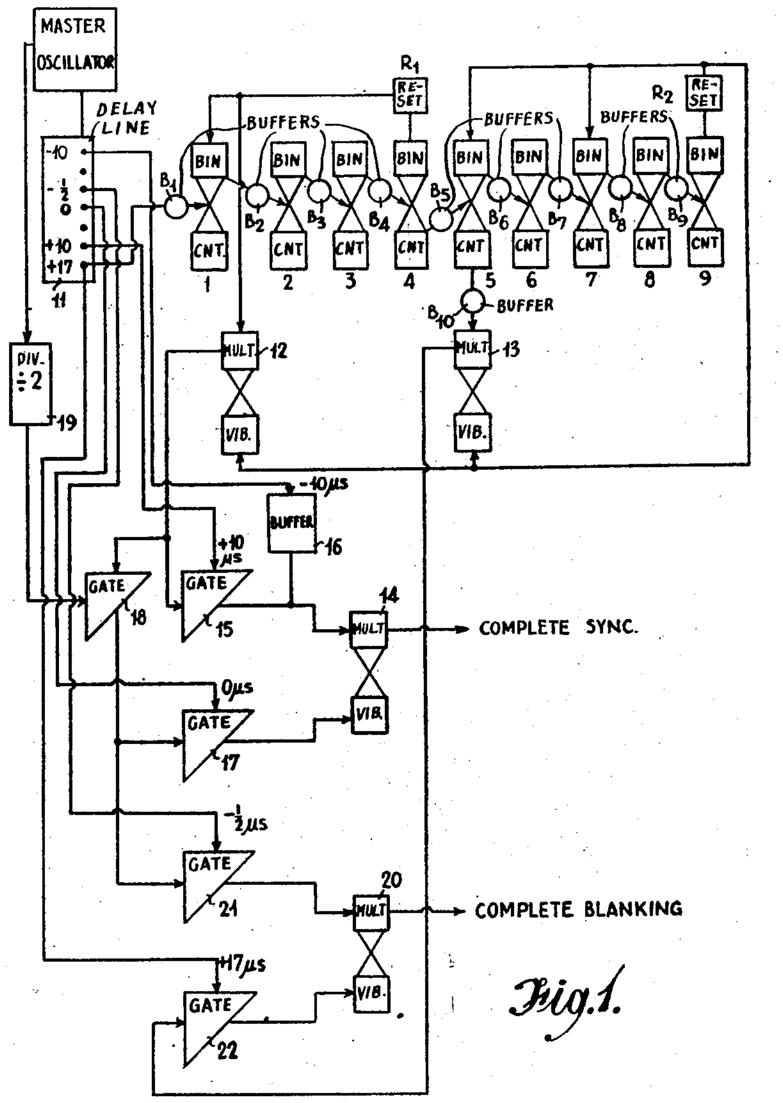
Figure 1 shows a block circuit diagram of a waveform generator according to the invention for producing a waveform corresponding to the British standard television system.

Referring to Fig. 1 the waveform generator incorporates a divider comprising nine binary counters, 1, 2, 3, 4, 5, 6, 7, 8, 9, which are divided into two stages. The first stage comprising the first four binary counters is arranged to divide by 15, and the second stage comprising the 5th to the 9th binary counters to divide by 27. The total division is thus 405. The pulses from the master oscillator 10, which runs at twice line frequency, are fed to the delay line 11, and pulses with an appropriate delay are fed to the first binary counter 1 through a cathode follower buffer valve B1. The subsequent counters are also inter-coupled by cathode follower buffer valves B2 to B9 respectively. Each binary counter is arranged to trigger on the positive edge of an applied pulse. Feedback to achieve the desired count in each stage is effected through the resetting buffer valves R1, R2 respectively. Details of the circuit so far referred to are more fully described in the specification of co-pending application Serial No. 276,983 of William Geoffrey Parr, filed 17th March, 1952.

The feed through from the first to the second stage is, for positive triggering, taken from that anode of counter 4 opposite to that which provides feedback in the first stage.

The circuit also comprises two asymmetric multi-vibrators 12, 13 one side of each of which is connected to the feedback resetting line from the counter 9 so that each of the multi-vibrators 12 and 13 will assume a predetermined state with the frame feedback pulse, which is derived from the divider output pulse by differentiating and amplifying. Multi-vibrator 12 is changed to its other state by the feedback pulse from counter 4, thereby giving an output pulse from multi-vibrator 12 which is four lines (8 half lines) wide, commencing with the divider output pulse. Multi-vibrator 13 changes to its other state with the first positive edge on that side of counter 5 opposite to that which feeds through to the counter 6 to give a pulse 15 lines (30 half lines) wide commencing with the divider output pulse. Counter 5 is connected to multi-vibrator 13 through the buffer valve B10. Both the output pulses from the multi-vibrators 12 and 13 thus begin with the same 50-cycle frame triggering pulse while being respectively 4 and 15 lines long.

Figure 2:
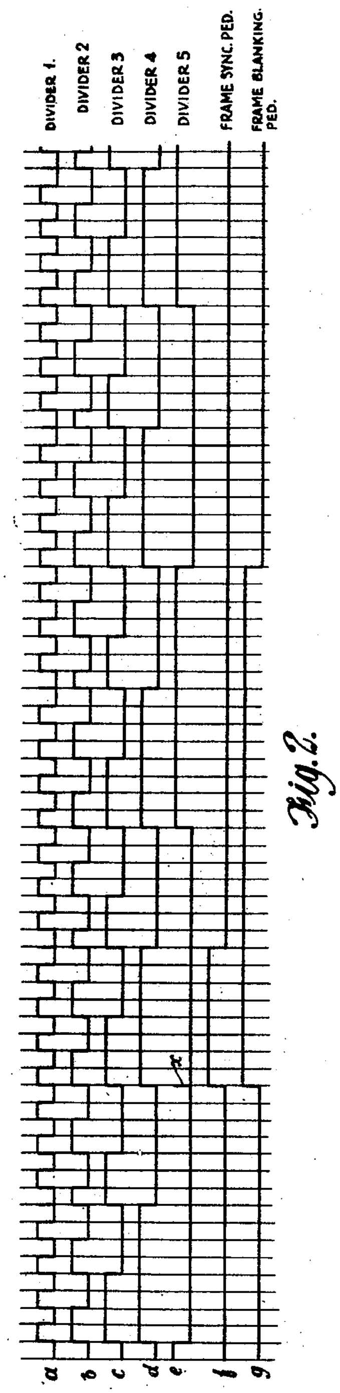
Figure 2 shows curves for explaining the operation of the dividers and the production of the frame synchronising pedestal and the frame blanking pedestal with the circuit shown in Figure 1.

The mode of operation of the apparatus so far described will be clear from Figure 2 of which curves *a*, *b*, *c*, *d* and *e* show the output waveforms from the dividers 1–5 respectively for that part of the frame period which embraces the frame blanking period only. X in curve *e* indicates the effect of the feedback pulse on divider 5. Curve *f* shows the frame synchronising pedestal which is triggered on by the output pulse from divider 9 (feedback pulse to divider 5), and off by the feedback pulse (to divider 1) from divider 4 occurring four lines later. Curve *g* shows the frame blanking pedestal which is triggered on by the feedback pulse to divider 5 and off at the same time as the next negative going pulse from divider 5 fifteen lines later.

Figure 1 also shows the circuit arrangement for producing the complete synchronising waveform and the complete blanking waveform. Its mode of operation will be explained with reference to the waveforms shown in Figure 3 which are drawn to a larger scale than Fig. 2. It should be noted that these waveforms are drawn for one frame period only; the next frame period would be similar but with a half line difference in phase between the line and frame period pulses.

The complete synchronising waveform is generated by the asymmetric multi-vibrator 14. To the upper element of this multi-vibrator are fed the +10 μs. pulse from the delay line 11 through the gate 15 which is closed during the four-line frames synchronising pedestal derived from the multi-vibrator 12. Also fed to this upper element of the multi-vibrator 14 are the −10 μs. pulses from the delay line 11, and according to a feature of the invention these are fed to the multi-vibrator 14 through a buffer stage 16 without gating. The pulses fed to this upper element of the multi-vibrator 14 are as shown in curve *d* of Fig. 3, the +10 μs. pulses being gated out during the four-line frame synchronising pedestal which is shown in curve *k*.

To the lower element of the multi-vibrator 14 are fed the 0 μs. pulses from the delay line 11 (0 μs. pulses correspond to the leading edges of the line pulses) through a gate 17 which eliminates alternate pulses except during the frame synchronising pedestal. The gating waveform fed to the gate 17 is shown in curve *b* and is produced by the gate 18 to which are fed a train of master oscillator pulses, after division by 2 in the divider 19, and also the frame synchronising pedestal from the multi-vibrator 12. The gate 18 allows the divide-by-2 waveform to pass except during the frame synchronising pedestal period. The waveform from the gate 18 as shown in curve *b* thus controls the gate 17 and allows the train of 0 μs. pulses as shown in curve *c* to be fed through to the lower element of the multi-vibrator 14.

Figure 3:
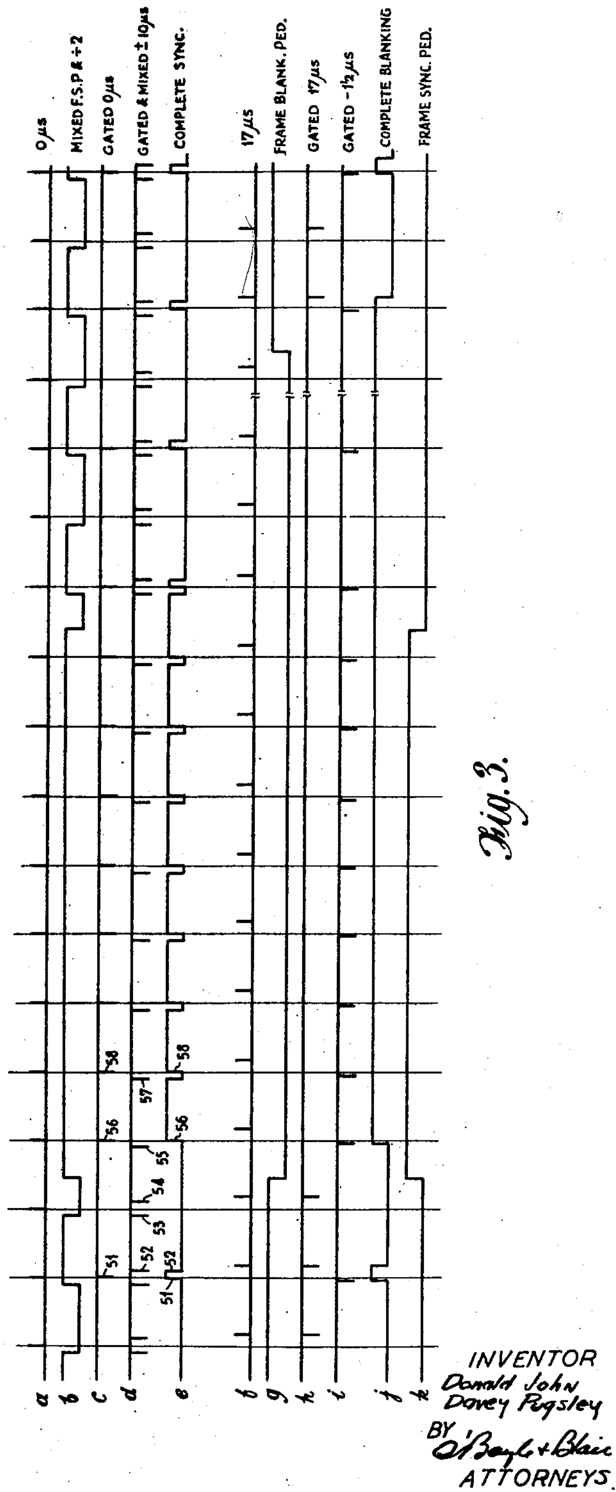
Figure 3 shows curves explaining the production of the complete synchronising waveform and complete blanking waveform with the apparatus shown in Figure 1.

The output waveform from the multi-vibrator 14 will be as shown in curve *e* of Fig. 3, the multi-vibrator being triggered by the 0 μs. pulse 51 and reversed by the immediately following +10 μs. pulse 52. The next following −10 μs. and +10 μs. pulses 53, 54, 55 do not change the state of multi-vibrator 14 which is not again changed until the next 0 μs. pulse 56. By reason of the next following +10 μs. pulse having been gated out, the multi-vibrator will not reverse until the next −10 μs. pulse 57, and will shortly thereafter again change its state by the 0 μs. pulse 58. The multi-vibrator changes state during the remaining period of the frame synchronising pedestal by the successive −10 μs. and 0 μs. pulses whereafter it will be triggered by the +10 μs. and 0 μs. pulses to produce the line synchronising pulses as shown in curve *e*. The complete synchronising waveform thus appears at the output of the multi-vibrator 14.

The complete blanking waveform is generated by the asymmetric multivibrator 20, the upper element of which is triggered by the −½μs. pulses after being gated in the gate 21 by the waveform (curve *b* of Figure 3) from the gate 18. The output from the gate 21 is as shown in curve *i* of Figure 3. The lower element of the multivibrator 20 is triggered by the +17 μs. pulses from the delay line 11 after passing through the gate 22 controlled by the frame blanking pedestal derived from the multivibrator 13. In Figure 3 the curve *f* shows the train of +17 μs. pulses, curve *g* the frame blanking pedestal, and curve *h* the gated +17 μs. pulses. The multivibrator 20 is thus triggered by the pulse of curves *h* and *i* and the resultant output from the multivibrator 20 is the complete blanking waveform shown in curve *j* of Fig. 3.

To ensure that the divider delay time does not cause undue complications, the first counter 1 is triggered from or after the +17 μs. delay point on the delay line 11, which is the point from which line blanking is triggered.

Figure 4:
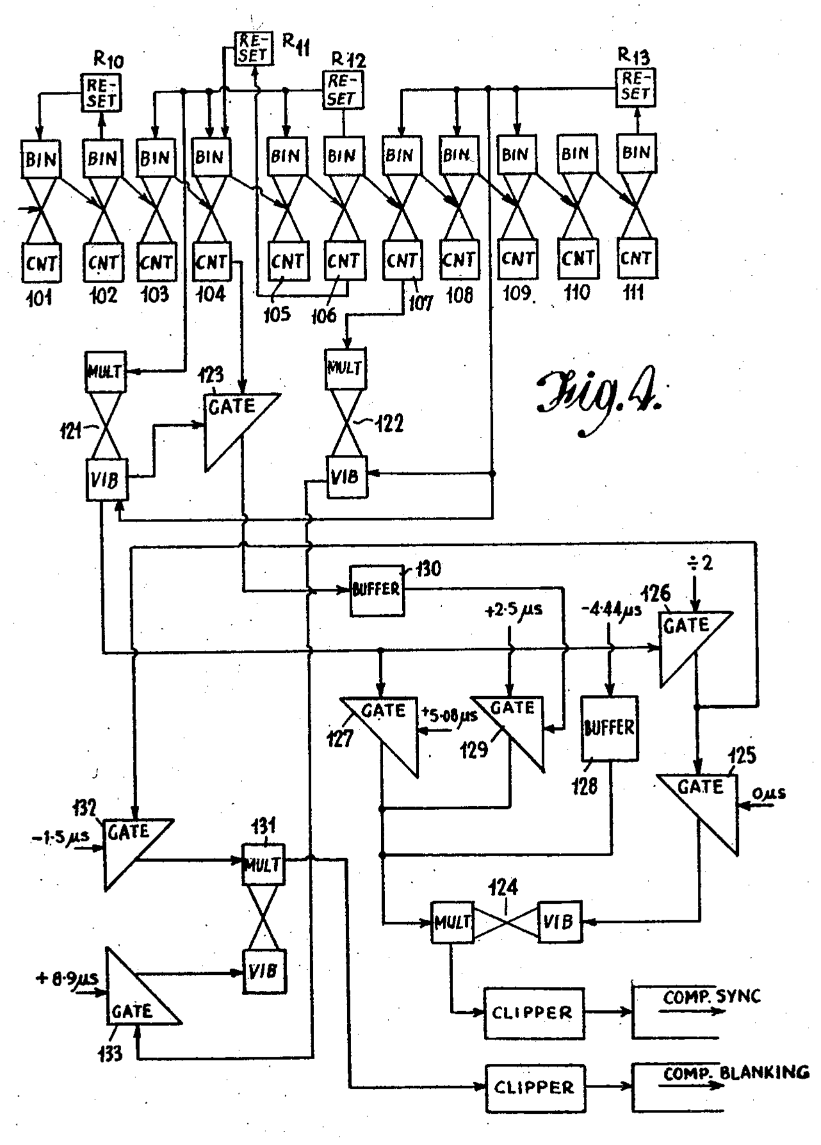
Figure 4 shows a block circuit diagram of a waveform generator according to the invention for producing a waveform of a 525-line system as used in the United States of America.

Figure 4 shows an apparatus suitable for generating a 525-line television waveform. This circuit comprises 11 binary counters 101 to 111 arranged in three groups dividing by 3, 7 and 25 respectively. The circuit details may again be similar to the circuit described in the specification of co-pending application Serial No. 276,983 of William Geoffrey Parr, filed 17th March, 1952, with the resetting pulses being applied to the "earth" ends of grid resistors. In the circuit diagrammatically illustrated in Fig. 4 the buffer valves between the different binary counters are omitted, the pulses being fed on to the grids of the following binary counters through appropriate condensers. Resetting pulses to achieve the desired counts are fed back through the resetting valves R10, R11, R12 and R13 as shown in Fig. 4.

Figure 5:
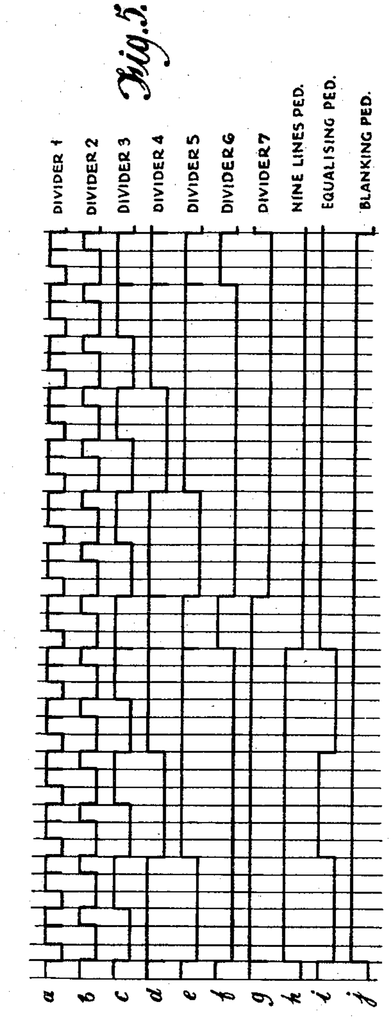
Figure 5 shows curves for explaining the operation of the dividers and the production of the frame synchronising pedestal, equalising pedestal and blanking pedestal with the circuit shown in Figure 4.

Fig. 5 shows in curves *a* to *g* the output waveforms from the first 7 dividers over a period of 42 half-lines. In order to produce the required frame pulses for the standard American 525-line system, it is necessary to produce a frame synchronising pedestal which is 9 lines wide, an equalising pedestal comprising two 3 line wide pulses spaced by three lines, and a frame blanking pedestal which is 21 lines wide. These pulses are produced by associating with the divider network two additional multivibrators 121 and 122 and a gating circuit 123. Both the multivibrators are fed on one side with the frame output pulse from the last counter 111. The other side of multivibrator 121 is triggered by the feedback pulse from the sixth counter 106 and therefore produces an output pulse from multivibrator 121 which is 9 lines wide, as shown in curve *h* of Fig. 5. The gating circuit 123 is also opened when multivibrator 121 is switched by the frame output pulse from the last counter 111, and is closed when the multivibrator 121 is switched back to its normal state by the pulse from divider 106 after 9 lines. The gate circuit passes the waveform from counter 104 during this 9 line period. Gate circuit 123 thus passes the first 9 lines of the output from counter 104 and the waveform shown in curve *i* of Fig. 3 appears in the output. The phase of the waveform is reversed by reason of the fact that the output is taken from the lower element of the 4th counter 104. Thus this output constitutes the required equalising pedestal being two 3-line periods separated by 3 lines.

The second multivibrator 122 which is triggered in one direction by the frame output pulse from counter 111 has its opposite side connected to the lower element of counter 107 so that multivibrator 122 will be switched on by a frame pulse and off by the pulse from counter 107 occurring 21 lines later. The output pulses from the multivibrator 122 thus constitutes the required blanking pedestal, 21 lines wide, as shown in curve *j* of Fig. 5.

Figure 6:
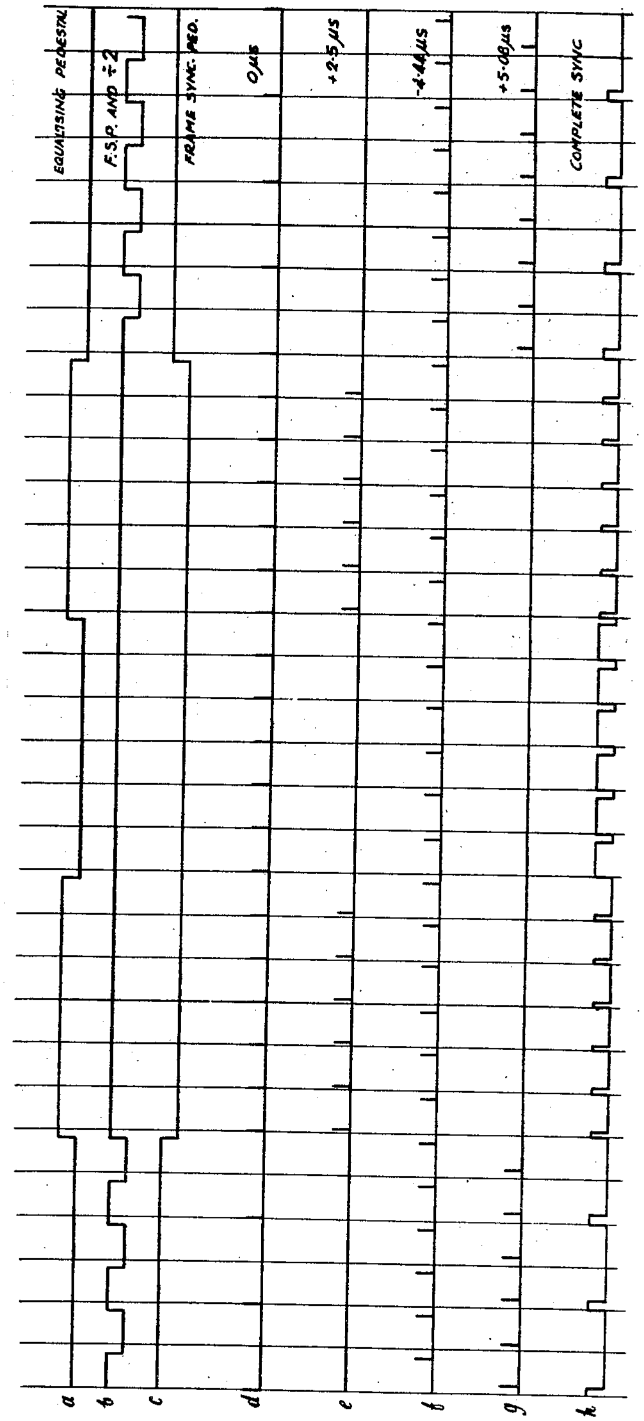
Figure 6 shows curves explaining the production of the complete synchronising waveform with the apparatus according to Figure 4.

Figure 4 also shows the circuit arrangement for producing the complete synchronising waveform and the complete blanking waveform. The mode of operation for producing the complete synchronising waveform will be explained with reference to Fig. 6.

The complete synchronising waveform is generated by the asymmetric multivibrator 124. To the right-hand element of this multivibrator are fed the 0 μs. pulses from the delay line through a gate 125 which eliminates alternate pulses except during the frame synchronising pedestal. The gating waveform fed to the gate 125 is shown in curve *b* in Figure 6 and is produced by the gate 126 to which are fed a train of master oscillator pulses after division by 2 in a divider similar to the divider 19 in Figure 1, and also the frame synchronising pedestal from the multivibrator 121. The gate 126 allows the divide-by-2 waveform to pass except during the frame synchronising pedestal period. The waveform from the gate 126 is as shown in curve *b* and allows the train of 0 μs. pulses as shown in curve *d* to be fed through to the right-hand element of the multivibrator 124.

To the left-hand element of the multivibrator 124 are fed the +5.08 μs. pulses from the delay line through the gate 127 which is closed during the 9 line frame synchronising pedestal derived from the multivibrator 121 (curve *g*). Also fed to this left-hand element of the multivibrator 124 are the −4.44 μs. pulses from the delay line through the buffer stage 128 without gating (curve *f*). A further set of pulses fed to the left-hand end element of the multivibrator 124 are the +2.5 μs. pulses from the delay line which are fed through the gate 129 controlled by the equalising pedestal from the gate 123, via the buffer 130, so that these +2.5 μs. pulses only pass the gate 129 during the two three-line periods of the equalising pedestal as shown in curve *e*. The multivibrator 124 is thus triggered in one direction by the pulses shown in curve *d* and in the other direction by the pulses shown in curves *e*, *f* and *g* and the resultant output from the multivibrator is the complete synchronising waveform shown in curve *h* of Figure 6.

The complete blanking waveform is generated by the asymmetric multivibrator 131, the upper element of which is triggered by −1.6 μs. pulses after being gated in the gate 132 by the waveform (shown in curve *b* of Figure 6) from the gate 126. The lower element of the multivibrator 131 is triggered by the +8.9 μs. pulses from the delay line after passing through the gate 133 which is closed during the frame blanking pedestal derived from the multivibrator 122. The output from the multivibrator 131 then comprises the complete blanking waveform which is generated in a manner identical with that described with reference to curves *f*, *g*, *h*, *i*, and *j* of Figure 3.

Whilst particular embodiments have been described, it will be understood that various modifications may be made without departing from the scope of the invention. Thus the buffer valves between the binary counters of Fig. 1 are only necessary when the binary counters are triggered by the positive going edges of the preceding counter. If the binary counters are to be triggered by the negative going edges of the preceding counter, the buffer valves are eliminated, as with the circuit illustrated in Fig. 4. Further, by suitable design of the divider network, circuits can be designed for generating 625-line, 819-line and other standard television waveforms.

I claim:

1. Apparatus comprising a master oscillator, a divider fed from the output of said master oscillator, a plurality of output points on said divider at different ratios of division, a plurality of switch devices, means for switching all of said switch devices in one direction by the output from one of said output points, and means for respectively switching each of said switch devices, in the other direction by one of the outputs from the others of said output points.

2. Apparatus comprising a master oscillator, a divider comprising a plurality of series connected binary electronic counters fed from the output of said master oscillator, a plurality of outputs at intermediate points on said divider and at different ratios of division, a plurality of switch devices equal to the number of intermediate output points on said divider, each switch device comprising a bi-stable multivibrator means for switching all of said switch devices in one direction simultaneously and means for respectively switching each of said switch devices in the other direction by one of the outputs from an intermediate output point on said divider.

3. Apparatus comprising a master oscillator, a divider comprising a plurality of series connected binary electronic counters fed from the output of said master oscillator, at least one feedback connection between stages of said divider, a plurality of outputs at intermediate points on said divider and at different ratios of division, a plurality of switch devices equal to the number of intermediate output points on said divider, means for switching all of said switch devices in one direction by the final output pulses from the divider, and means for respectively switching each of said switch devices in the other direction by one of the outputs from an intermediate output point on said divider.

4. Apparatus comprising a master oscillator, a divider comprising a plurality of series connected binary electronic counters fed from the output of said master oscillator, at least one feedback connection between stages of said divider, a plurality of outputs at intermediate points on said divider and at different ratios of division, a plurality of switch devices equal to the number of intermediate points on said divider, each switch device comprising a bi-stable multivibrator, means for switching all of said switch devices in one direction, and means for respectively switching each of said switch devices in the other direction by one of the outputs from an intermediate output point on said divider.

5. Apparatus comprising a master oscillator, a divider comprising a plurality of series connected binary electronic counters fed from the output of said master oscillator, at least one feedback connection between stages of said divider, two intermediate output points on said divider at different ratios of division, and a final output point on said divider, two switch devices, means for switching both of said switch devices in one direction by the final output pulses from the divider, and means for respectively switching each of said switch devices in the other direction by one of the output pulses from an intermediate point on said divider.

6. Apparatus for generating a waveform comprising line and frame synchronising pulses, particularly for television transmission systems, comprising a master oscillator, a delay line fed from the output of the master oscillator, a divider fed from the output of the delay line, means for deriving output pulses at the frame repetition frequency from said divider, means for producing a train of pulses from each of a plurality of intermediate points on said divider, a plurality of switch circuits corresponding to the number of intermediate points on said divider, means for triggering all of said switch circuits in one direction simultaneously, means for feeding each of the trains of pulses from the plurality of intermediate points on said divider respectively to one of said switch circuits, to trigger said switch circuit in the other direction, means for deriving trains of pulses from along said delay line at intervals of time corresponding to the leading and trailing edges of said line and frame synchronising pulses, a complete synchronising pulse generator, a buffer circuit, and means for feeding the pulses corresponding to the trailing edges of said frame synchronising pulses continuously to said complete synchronising pulse generator through said buffer circuit.

7. Apparatus for generating a waveform comprising line and frame synchronizing pulses, particularly for television transmission systems, comprising a master oscillator, a delay line fed from the output of the master oscillator, a divider fed from the output of the delay line, means for deriving output pulses at the frame repetition frequency from said divider, means for producing a train of pulses from two intermediate points on said divider, two switch circuits, means for feeding the output pulses from said divider to trigger both of said switch circuits in one direction, means for feeding one of the trains of pulses from the two intermediate points on said divider to each said switch circuit, to trigger said switch circuits in the other direction, means for deriving trains of pulses from along said delay line at intervals of time corresponding to the leading and trailing edges of said line and frame synchronizing pulses, a complete synchronising pulse generator, a buffer circuit, and means for feeding the pulses corresponding to the trailing edges of said frame synchronising pulses continuously to said complete synchronising pulse generator through said buffer circuit.

8. Apparatus for generating a waveform comprising line and frame synchronising pulses, particularly for television transmission systems, comprising a master oscillator operating at an integral multiple of the line pulse repetition frequency, a delay line fed from the output of the master oscillator, a divider comprising a plurality of series connected binary electronic counters fed from the output of the delay line, means for deriving output pulses at the frame repetition frequency from said divider, means for producing trains of pulses from a plurality of intermediate points on said divider, a plurality of bi-stable multivibrator circuits corresponding to the number of intermediate points on said divider, means for feeding the output pulses from said divider to trigger all of said multivibrator circuits in one direction, means for feeding each of the trains of pulses from the plurality of intermediate points on said divider respectively to one of said multivibrator circuits, to trigger said multivibrator circuit in the other direction, means for deriving trains of pulses from along said delay line at intervals of time corresponding to the leading and trailing edges of said line and frame synchronising pulses, a complete synchronising pulse generator, a buffer circuit, and means for feeding the pulses corresponding to the trailing edges of said frame synchronising pulses continuously to said complete synchronising pulse generator through said buffer circuit.

9. Apparatus for generating a waveform comprising line and frame synchronising pulses, particularly for television transmission systems, comprising a master oscillator, a delay line, means for feeding the output of said master oscillator to said delay line, means for deriving pulses from along said delay line at instants of time corresponding to the leading and trailing edges of said line and frame synchronising pulses, a complete synchronising pulse generator, a buffer circuit means for feeding the pulses corresponding to the trailing edges of said frame synchronising pulses continuously to said complete synchronising pulse generator through said buffer circuit and means for deriving a waveform comprising the line and frame synchronising pulses from said complete synchronising pulse generator.

10. Apparatus comprising a master oscillator, a divider fed from the output of said master oscillator, a plurality of outputs at intermediate points on said divider and at different ratios of division, a plurality of switch devices equal to the number of intermediate points on said divider, means for switching all of said switch devices in one direction simultaneously and means for respectively switching each of said switch devices in the other direction by one of the outputs from an intermediate output point on said divider.

11. Apparatus comprising a master oscillator, a divider comprising a plurality of series connected binary electronic counters fed from the output of said master oscillator, a plurality of outputs at intermediate points on said divider and at different ratios of division, a plurality of switch devices equal to the number of intermediate points on said divider, means for switching all of said switch devices in one direction simultaneously, and means for respectively switching each of said switch devices in the other direction by one of the outputs from an intermediate output point on said divider.

12. Apparatus comprising a master oscillator, a divider fed from the output of said master oscillator, at least one output at an intermediate point on said divider, at least one switch device, the number of switch devices being equal to the number of intermediate points and each switch device being directly connected to one of said intermediate points on said divider, pulse means for switching said at least one switch device in one direction and means for switching said at least one switch device in the other direction by the output from the intermediate output point on said divider to which it is connected.

13. Apparatus comprising a master oscillator, a divider comprising eleven series connected binary electronic counters fed from the output of said master oscillator, a first feedback connection from said second binary counter to said first binary counter, a second feedback connection from said sixth binary counter to said third, fourth and fifth binary counters, a third feedback connection from said eleventh binary counter to said seventh, eighth and ninth binary counters, a first output from said second feedback connection, a second output from said seventh binary counter, two switch devices, each switch device comprising a bi-stable multi-vibrator, means for switching both of said switch devices in one direction simultaneously by an output pulse from said third feedback connection, means for switching one of said switch devices in the other direction by a pulse from said first output, and means for switching the other of said switch devices in the other direction by a pulse from said second output.

14. Apparatus for generating a television waveform comprising line and frame synchronising pulses, particularly for television transmission systems, comprising a master oscillator, a delay line fed from the output of the master oscillator, means for deriving trains of pulses from along said delay line at intervals of time corresponding to the leading and trailing edges of said line and frame synchronising pulses, a complete synchronising pulse generator, means for feeding the pulses corresponding to the trailing edges of said frame synchronising pulses continuously to said complete synchronising pulse generator, and means for deriving a waveform comprising the line and frame synchronising pulses from said complete synchronising pulse generator.

References Cited in the file of this patent

UNITED STATES PATENTS

| | | |
|---|---|---|
| 2,402,916 | Schroeder | June 25, 1946 |
| 2,525,102 | Shade | Oct. 10, 1950 |
| 2,591,816 | Holland et al. | Apr. 8, 1952 |
| 2,644,887 | Wolfe | July 7, 1953 |
| 2,645,713 | Pritchard | July 14, 1953 |